(12) United States Patent
Gil et al.

(10) Patent No.: US 8,270,029 B2
(45) Date of Patent: Sep. 18, 2012

(54) METHODS, APPARATUS AND SYSTEMS FOR USING BLACK-ONLY ON THE NEUTRAL AXIS IN COLOR MANAGEMENT PROFILES

(75) Inventors: Alvaro Enrique Gil, Rochester, NY (US); Lalit Keshav Mestha, Fairport, NY (US); James Michael Sanchez, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 500 days.

(21) Appl. No.: 12/631,069

(22) Filed: Dec. 4, 2009

(65) Prior Publication Data

US 2010/0225939 A1    Sep. 9, 2010

Related U.S. Application Data

(60) Provisional application No. 61/158,635, filed on Mar. 9, 2009.

(51) Int. Cl.
*H04N 1/46* (2006.01)
*G06F 15/00* (2006.01)

(52) U.S. Cl. .......................................... 358/1.9; 358/518

(58) Field of Classification Search .................. 358/1.9, 358/521, 504, 518; 345/600
See application file for complete search history.

(56) References Cited

U.S. PATENT DOCUMENTS

| | | | |
|---|---|---|---|
| 2008/0150960 A1* | 6/2008 | Edge et al. | 345/600 |
| 2009/0161125 A1 | 6/2009 | Mestha et al. | |
| 2009/0296109 A1* | 12/2009 | Maltz et al. | 358/1.9 |

OTHER PUBLICATIONS

U.S. Appl. No. 12/127,719, filed May 27, 2008, Gil et al.
L.K. Mestha et al., "Gray balance control loop for digital color printing systems," Published in the Proceedings of IS&T's "The 21st International Congress on Digital Printing Technologies (NIP21)," Sep. 18-23, 2005, Baltimore, Maryland.
LK Mestha and SA Dianat, "Control of Color Imaging Systems: Analysis and Design," Section 7.5.2.1, ISBN: 978 0 8493 3746 8, Dec. 2009.

* cited by examiner

*Primary Examiner* — Jerome Grant, II
(74) *Attorney, Agent, or Firm* — Fay Sharpe LLP (57) ABSTRACT

This disclosure provides methods, apparatus and systems for generating and using color management profiles. Specifically, the color management profiles generated include K-only colorant recipes for image colors associated with a neutral axis.

24 Claims, 11 Drawing Sheets

METHODS, APPARATUS AND SYSTEMS FOR USING BLACK-ONLY ON THE NEUTRAL AXIS IN COLOR MANAGEMENT PROFILES

This application claims priority of Provisional Patent Application No. 61/158,635, by Gil et al., filed Mar. 9, 2009 and entitled "METHODS AND CONTROL ALGORITHMS FOR USING BLACK ONLY ON THE NEUTRAL AXIS IN COLOR MANAGEMENT PROFILES" and the disclosure of which is totally incorporated herein by reference in its entirety.

BACKGROUND

GCR's (Gray Component Replacement) design is an important part in the process of generating ICC (International Color Consortium) profiles to be used for rendering high quality images. The designer pays special attention to the CMYK response everywhere in the gamut of the printer. Particularly some of the key colors (e.g., black in flesh tones and sky tones) need less black ink. These adjustments are stored as standard profiles (e.g., ICC profiles). In some cost-critical imaging applications, customers are interested in using black-only toner/ink when their images contain R=G=B pixels. For such applications, the image path should have a provision to transform the image RGB pixels to K only responses resulting in the generation of "K" only click charges. This approach is preferred by many customers to save the cost of color toner.

Solutions previously or currently offered include, for example: (i) print as grayscale option; (ii) color mode—grayscale; (iii) use of Pure Rendering Intent, and (iv) a search method that renders R=G=B pixels with K only. The grayscale printing uses a single R=G=B to K look-up table (LUT) designed for sRGB source space which is not optimized for image quality (IQ). Also, if the job in question requires this rendering for only specific pages (i.e. all back sides in a job), Exception Page Programming must be used, which can be tedious and cumbersome. Pure rendering is used for text only option and is not optimized for good IQ for R=G=B pixels. Hence this solution is usually unacceptable for high quality cost-critical customers.

Presented herein is a GCR-based approach to replace the output CMYK to print K only for neutrals, which helps to increase the applicability to multiple source spaces. An example use of this feature is when a user/customer has a desire to print K only for neutrals particularly while honoring the embedded source profiles.

INCORPORATION BY REFERENCE

The following references are incorporated herein by reference, each in their entirety.

U.S. patent application Ser. No. 11/959,824, filed Dec. 19, 2007, by Mestha et al., entitled "A METHOD FOR CLASSIFYING A PRINTER GAMUT INTO SUBGAMUTS FOR IMPROVED SPOT COLOR ACCURACY."

U.S. patent application Ser. No. 12/127,719, filed May 27, 2008, by Gil et al., entitled "COOPERATIVE NEIGHBOR PRINTING SYSTEM PROFILE METHODS AND SYSTEMS."

L K Mestha et al, "GRAY BALANCE CONTROL LOOP FOR DIGITAL COLOR PRINTING SYSTEMS," Published in the Proceedings of IS&T's "The 21st International Congress on Digital Printing Technologies (NIP21)," Sep. 18-23, 2005, Baltimore, Md.

L K Mestha and S A Dianat, "CONTROL OF COLOR IMAGING SYSTEMS: ANALYSIS AND DESIGN," Section 7.5.2.1, ISBN: 978 0 8493 3746 8.

BRIEF DESCRIPTION

In this disclosure, a method is provided to modify both the colorimetric and/or perceptual look up tables (LUTs) to allow K-only printing for image color associated with a neutral axis, while at the same time maintaining high image quality (IQ) for resulting images.

In one embodiment of this disclosure, described is a method of generating a multidimensional destination profile for a color printing device, the color printing device including a plurality of non-black colorants and a black colorant, the method comprising receiving a device independent multidimensional data representation of a plurality of target colors, the multidimensional data representations associated with a plurality of nodes in a device independent color space. Running a process to generate a first destination profile for the color printing device, the first destination profile mapping the device independent multidimensional data representations associated with the plurality of target colors to device dependent multidimensional data representations associated with a device dependent color space, the device dependent multidimensional data representative of a plurality of colorant recipes for rendering the target colors using the color printing device, determining neutral axis target colors which are substantially representative of a neutral axis associated with the device independent color space; and modifying the first destination profile to generate a second destination profile by replacing the device dependent multidimensional data representations mapped to the neutral axis target colors with black only device dependent data representations, the black only device dependent data representative of the black colorant amount for rendering the neutral axis target colors using the color printing device, wherein the first destination profile is modified by iteratively calculating the black only device dependent data representations using a color printing device model or the color printing device, where the initial estimate of a black only device dependent data representation associated with a respective neutral axis target color is a black only device dependent data representation associated with a neighboring neutral axis target color.

In another embodiment of this disclosure, described is a printing apparatus controller comprising a computer-usable data carrier storing instructions that, when executed by the controller cause the controller to perform a method of generating a multidimensional destination profile for a color printing device, the color printing device including a plurality of non-black colorants and a black colorant, the method comprising a) receiving a device independent multidimensional data representation of a plurality of target colors, the multidimensional data representations associated with a plurality of nodes in a device independent color space; b) running a process to generate a first destination profile for the color printing device, the first destination profile mapping the device independent multidimensional data representations associated with the plurality of target colors to device dependent multidimensional data representations associated with a device dependent color space, the device dependent multidimensional data representative of a plurality of colorant recipes for rendering the target colors using the color printing device; c) determining neutral axis target colors which are substantially representative of a neutral axis associated with the device independent color space; and d) modifying the first destination profile to generate a second destination profile by replacing the device dependent multidimensional data representations mapped to the neutral axis target colors with black only device dependent data representations, the black only device dependent data representative of the black colorant amount for rendering the neutral axis target colors using the color printing device, wherein the first destination profile is modified by iteratively calculating the black only device dependent data representations using a color printing device model or the color printing device, where the initial estimate of a black only device dependent data representation associated with a respective neutral axis target color is a black only device dependent data representation associated with a neighboring neutral axis target color.

In yet another embodiment of this disclosure, described is a printing system comprising a color printing device including a plurality of non-black colorants and a black colorant, the color printing device configured to receive a data representation of a color image to be marked on a media substrate; and a controller operatively connected to the color printing device, the controller configured to access a multidimensional destination profile, the multidimensional destination profile generated by the method comprising a) receiving a device independent multidimensional data representation of a plurality of target colors, the multidimensional data representations associated with a plurality of nodes in a device independent color space; b) running a process to generate a first destination profile for the color printing device, the first destination profile mapping the device independent multidimensional data representations associated with the plurality of target colors to device dependent multidimensional data representations associated with a device dependent color space, the device dependent multidimensional data representative of a plurality of colorant recipes for rendering the target colors using the color printing device; c) determining neutral axis target colors which are substantially representative of a neutral axis associated with the device independent color space; and d) modifying the first destination profile to generate a second destination profile by replacing the device dependent multidimensional data representations mapped to the neutral axis target colors with black only device dependent data representations, the black only device dependent data representative of the black colorant amount for rendering the neutral axis target colors using the color printing device, wherein the first destination profile is modified by iteratively calculating the black only device dependent data representations using a color printing device model or the color printing device, where the initial estimate of a black only device dependent data representation associated with a respective neutral axis target color is a black only device dependent data representation associated with a neighboring neutral axis target color.

DETAILED DESCRIPTION

Disclosed are methods, apparatus and systems to generate multidimensional destination profiles for color printing devices.

Specifically, the following describes methods, apparatus and systems to modify both colorimetric and/or perceptual look up tables (LUTs) to allow K-only printing for color images, while at the same time maintaining high image quality (IQ) for resulting images. Notably, this disclosure provides details associated with RGB images to be printed using a CMYK printing device, however, the methods, apparatus and systems are not limited to any particular color spaces. Any color contained in an RGB image that is on the neutral axis (i.e., R=G=B) is rendered with only black toner. CMYK recipes are modified for all of the colors contained in the Relative Colorimetric/Perceptual LUTs constructed with conventional methods that are only on the neutral axis with only black colorant. In addition, disclosed is a control-based approach that exploits cooperation between nodes on the neutral axis in order to determine the K values that replace the CMYK values associated with colors on the neutral axis. The other non-black colors that are not on the neutral axis remain unaltered. Embodiments described herein may also use additional control algorithms, such as GCR and Gamut mapping methods, to achieve high quality K only prints.

At a high level, one aspect of this disclosure is to use a GCR as opposed to using the incoming sRGB tone values to replace the output CMYK to print K-only for neutrals (i.e., R=G=B pixels).

The disclosed control-based approach exploits cooperation between neighboring nodes on the neutral axis in order to determine the K values that replace the CMYK values associated with colors on the neutral axis. The other colors that are not on the neutral axis can remain unaltered or, in some GCRs, other colors may be altered to reduce contours. According to one exemplary embodiment, incorporated are cooperative neighboring techniques as disclosed in U.S. patent application Ser. No. 12/127,719, filed May 27, 2008 to smoothly transition using a reference L* vs. K response as described in the present disclosure.

Since the presently disclosed embodiments use the GCR to create device CMYK to print K only for neutrals, this approach is suitable for any source space that can be flexibly applied at raster image processing (RIP) time. This is one exemplary advantage over the sRGB only approach when multiple source spaces are used as in embedded source profiles.

Figure 1:
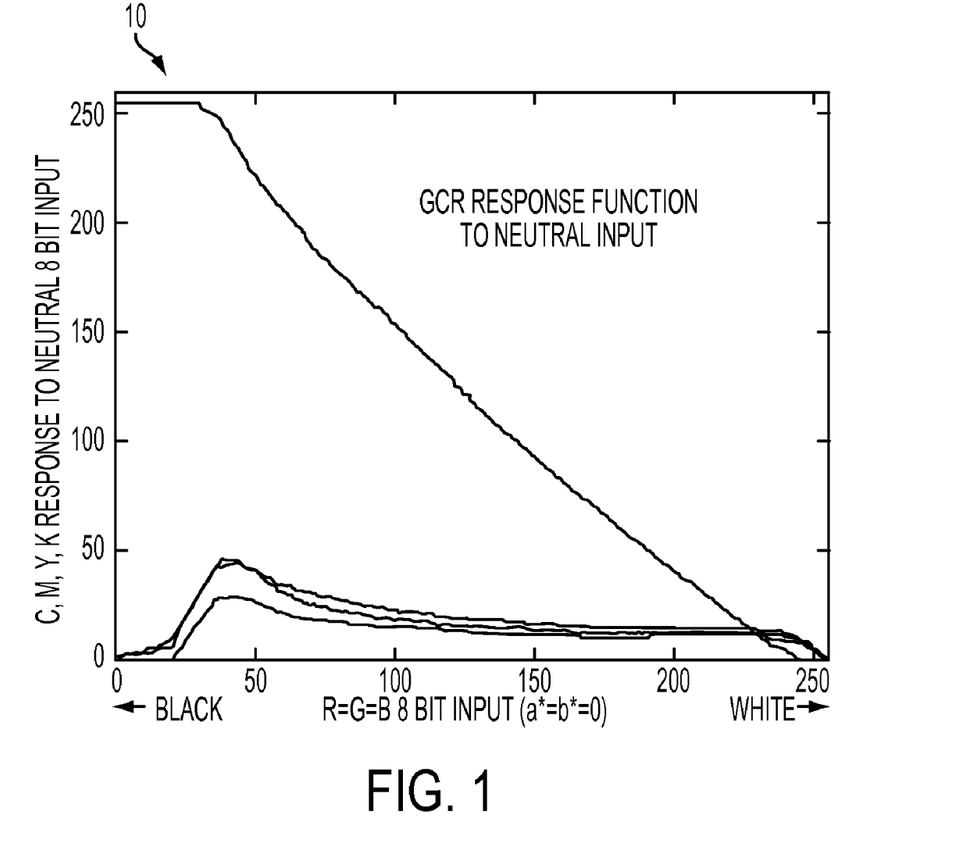
FIG. 1 is a plot CMYK response to colors on neutral axis for a 3 gamut class GCR.

With regard to the application of the disclosed K-only methods, there are cases where users/customers demand the use of only black ink for colors located on the neutral axis (i.e., R=G=B pixels). GCRs are normally designed to optimize the image quality by mixing CMY toners with K. For example, U.S. patent application Ser. No. 11/959,824 filed Dec. 19, 2007, by Mestha et al., discloses a Maximum K solution offered by 3 gamut class GCR. Although this solution uses maximum black for R=G=B pixels as shown by plot 10 in FIG. 1, this approach does not give C=M=Y=0 for rendering neutrals (i.e., R=G=B pixels). Hence it is not possible to print with K-only rendering using GCRs without forcing the CMY toners to be equal to zero. Even though customers want to only use black toner for colors on the neutral axis, they want to have high quality, contour free images everywhere else in the color space. If the CMY toners are forced to zero without paying attention to the neighboring pixels (i.e., pixels away from the neutral axis), then this approach has the risk of inducing undesirable contours in images.

The presently disclosed methods, apparatus and systems provide a control algorithmic technique to modify both the colorimetric and/or perceptual LUTs which have been created before-hand using a GCR constrained algorithm in the ICC profile. This is accomplished by using a control-based approach that exploits cooperation between nodes on the neutral axis in order to determine the K values that replace the CMYK values associated with colors on the neutral axis.

An exemplary customer workflow incorporating the disclosed K-only approach involves the following summarized steps.

(1) The customer creates a destination profile using data collected from a measurement process.

(2) As an add-on to the computation of step (1), an additional RGB to K profile is created in the background using the K-only methods disclosed.

It is assumed that a Relative Colorimetric or Perceptual Intent profile LUT is already created a priori and is made available for applying the disclosed K-only algorithms.

More particularly, steps to implement a modified colorimetric and/or Perceptual Intent profile including K-only for colors associated with a neutral axis are as follows:

1. Use a Relative Colorimetric LUT constructed with conventional methods (GCR, Gamut mapping, etc).
2. Use an available printer model.
3. Read the R=G=B levels contained in the LUT of step 1.
4. Stream the R=G=B array of steps through the LUT in step 1 above.
5. Capture the respective L* associated with each R=G=B node from step 4.
6. Use a control algorithm to determine the K values corresponding to every L* from step 5 (more details are provided below).
7. Replace the K values of each LUT CMYK output node located at R=G=B with the K values determined in step 6.
8. The modified LUT generated in step 7, with modified R=G=B output nodes along [0, 0, 0, K] is written into a color look-up table (CLUT) format.
9. The CLUT from step 8 is written into all CLUT BToA tags of the target ICC profile.
10. The ICC profile is written out with the desired name.
11. The user loads the ICC profile.
12. The Color Profile Manager, at the time step 10 is performed, maps a device link profile into the data base for the RIP.
13. Notably, steps 11 and 12 enable a user/customer to specify the profile created in step 10 on the destination side of Queue, but the image RIP is through the profile created in step 12.

Figure 2:
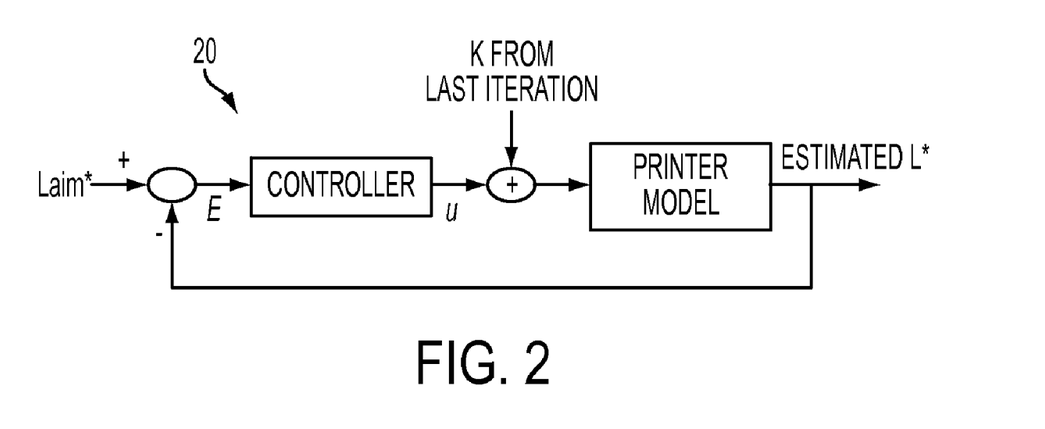
FIG. 2 is a block diagram of a system that derives the amount of black toner given an Laim*.

Details are now presented for the control algorithm that determines the K values for all the colors on the neutral axis. FIG. 2 shows a block diagram 20 of an exemplary control system, which takes an Laim* that is compared to an estimated L* obtained from a printer model using an initial black toner value (K). Another alternative could be to use the printer and an inline sensor to get the L*. The controller changes the amount of the current K value in order to minimize the error E. The initial K values used for each L* is shared by the previously completed neutral color to smooth the K response along the neutral axis. This can be summarized in the following steps:

i) Order all the n available L* values on the neutral axis from high to low values. Set j=1 and make Laim*=L*(j), which is the white point, L*(1)=100, and assign K(1)=0 to that level. The aims will be processed next in a decreasing order.

ii) Increase j.

iii) Set the current Laim*=L*(j) and K(j)=K(j−1). This means that the previous final K value determined for L*(j−1) will be used as initial estimate for Laim*. This is what is referred to herein as cooperating with neighbors to achieve a smooth response.

iv) Compute the controller parameters by using, for instance, a state-feedback controller (see L K Mestha et al, "Gray balance control loop for digital color printing systems," Published in the Proceedings of IS&T's "The 21st International Congress on Digital Printing Technologies (NIP21)", Sep. 18-23, 2005, Baltimore, Md.) to design a gain matrix that can be used during the iterations.

v) Perform m iterations using either a printer model or a printer, where m is pre-defined.

vi) Use a best actuators technique to select final K value to be associated to Laim* (see L K Mestha and SA Dianat, "Control of Color Imaging Systems: Analysis and Design," Section 7.5.2.1, ISBN: 978 0 8493 3746 8).

vii) If there are more L* values to process, then go to ii).

viii) Otherwise, stop.

In the event a customer also wants to modify an available Perceptual LUT using the same approach, then the same procedures described above can be applied by, for example, working with the Perceptual LUT in item 1 of the above approach instead of the Relative Colorimetric one. Customers might prefer to use the Perceptual intent sometimes since this may offer more details for dark colors when gamut compression is used in this area of the color space.

Figure 3:
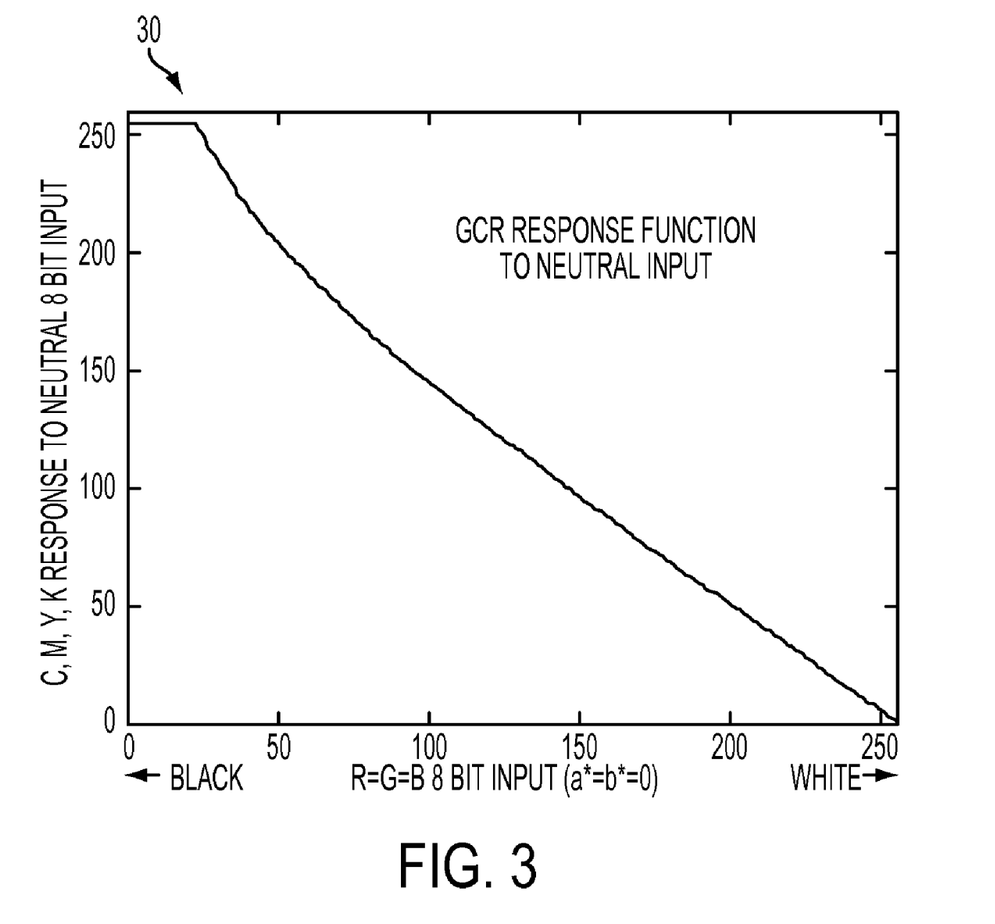
FIG. 3 is a plot of a black toner response.
Figure 4:
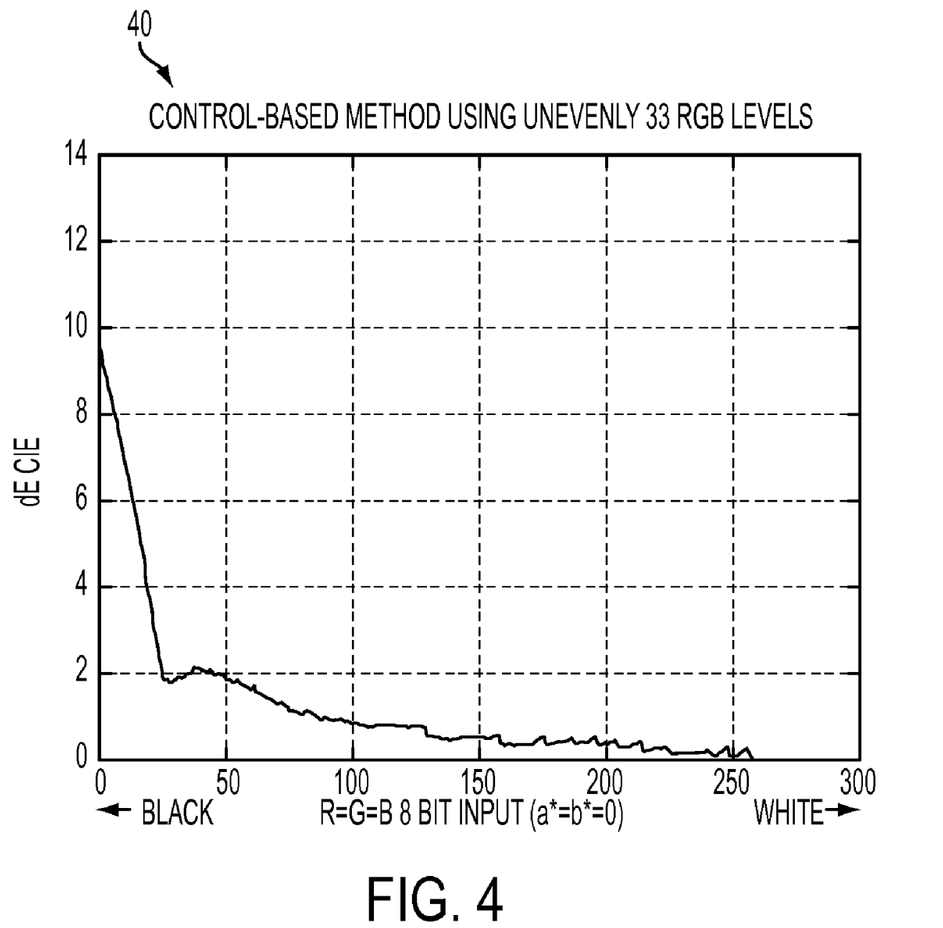
FIG. 4 is a plot of deltaE CIE values for the plot of FIG. 3.

There is now presented, with reference to FIGS. 3-4, exemplary simulation results of the concepts described herein. Shown in the figures are plots of a black toner response 30, and the deltaE CIE values 40 for the control-based approach using 33 cubes RGB levels unevenly spaced.

Figure 5:
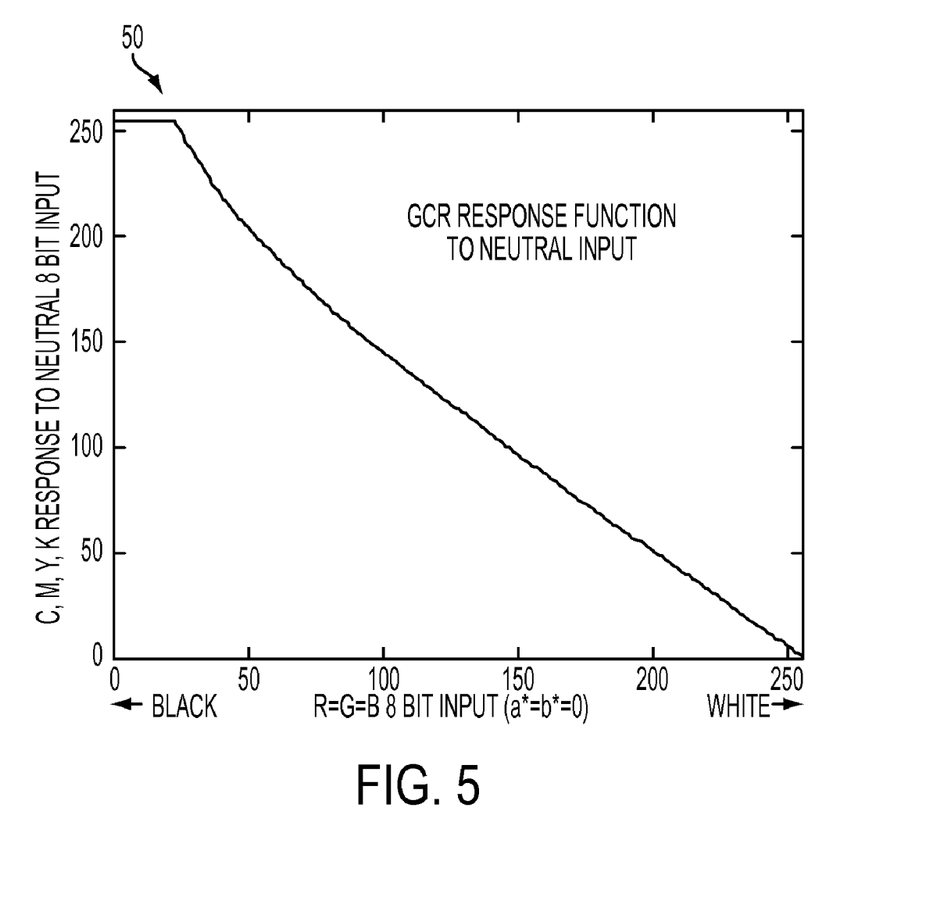
FIG. 5 is a plot of a modified relative colorimetric intent.
Figure 6:
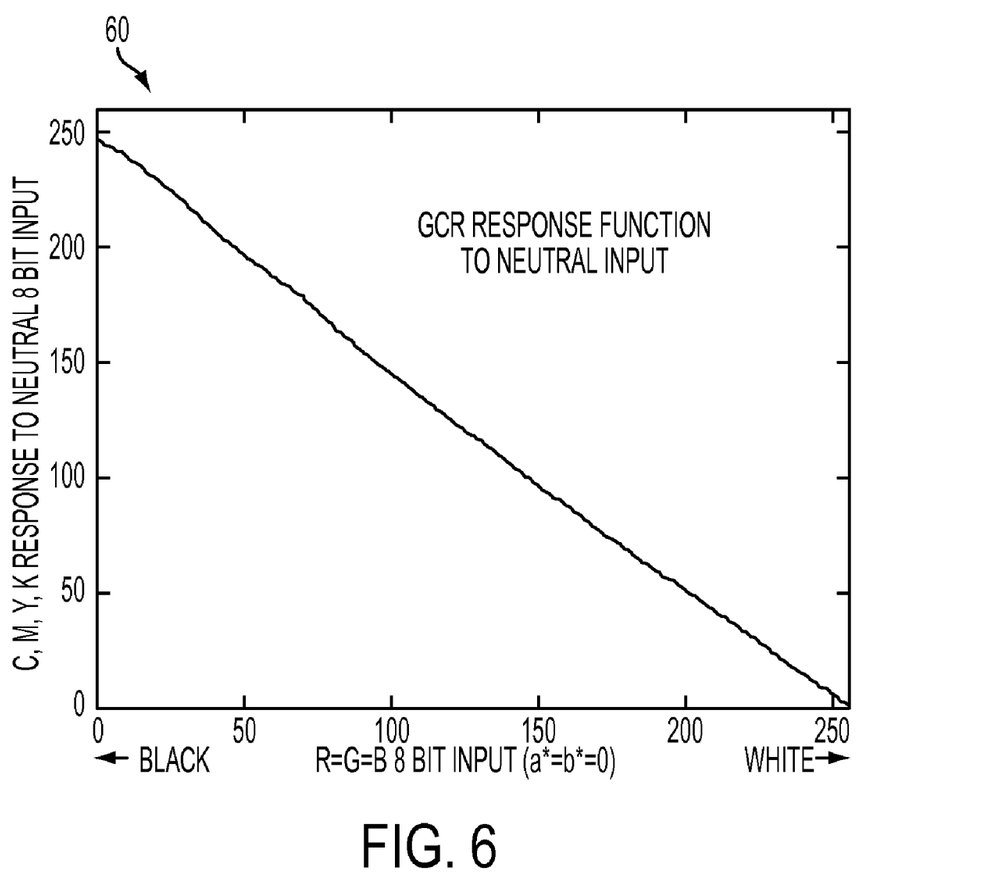
FIG. 6 is a plot of modified perceptual intent for the plot of FIG. 5.

An exemplary comparison of the black toner response for the Relative Colorimetric and Perceptual LUTs is shown with reference to FIGS. 5-6. Shown in the figures are plots of intents for a black toner response for the modified colorimetric 50, and the modified perceptual 60. The figures show the exemplary response of black toner along the neutral axis for both LUTs, where gamut compression was used for the Perceptual intent.

It is to be appreciated that, during runtime, the presently disclosed profile methods, apparatus and systems do not scan/detect the RGB or "accidental" colors. An RGB-to-K transformation look up table (LUT) is produced while generating a custom multidimensional profile LUT. This is effectively a combination of the source RGB to L*a*b* LUT and the L*a*b* to CMYK LUT with R=G=B values mapped to K only for the neutral axis. For example, whenever a user finds the need to ensure that grayscale images are counted as black and white only, this new transformation LUT is used to render the images instead of the normal RGB to CMYK LUT, which is again a combination of two transformations. The first being a standard RGB to L*a*b* source transformation LUT, and the second being the L*a*b* to CMYK destination transformation LUT. The result is an option that will not generate color click charges for a customer whenever there is an image with R=G=B values. By implementing the disclosed techniques, any search or scan of the incoming image file is removed, thereby providing a solution at rated RIP speed. Notably, scanning incoming images for "accidental" color will slow the RIP speed which can lead to customer dissatisfaction for production quality RIPs.

Some features associated with the K-only profiling methods, apparatus and systems include the following.

(1) A standard RGB to L*a*b* source transformation is used as a source LUT. Hence, no special detection is needed for pixels in RGB color space to determine which pixels contain gray scale values (i.e., R=G=B values). This occurs automatically at rated RIP speed while providing rendering with black only separation (i.e., color separations (C, M, Y) set to zero).

Figure 7:
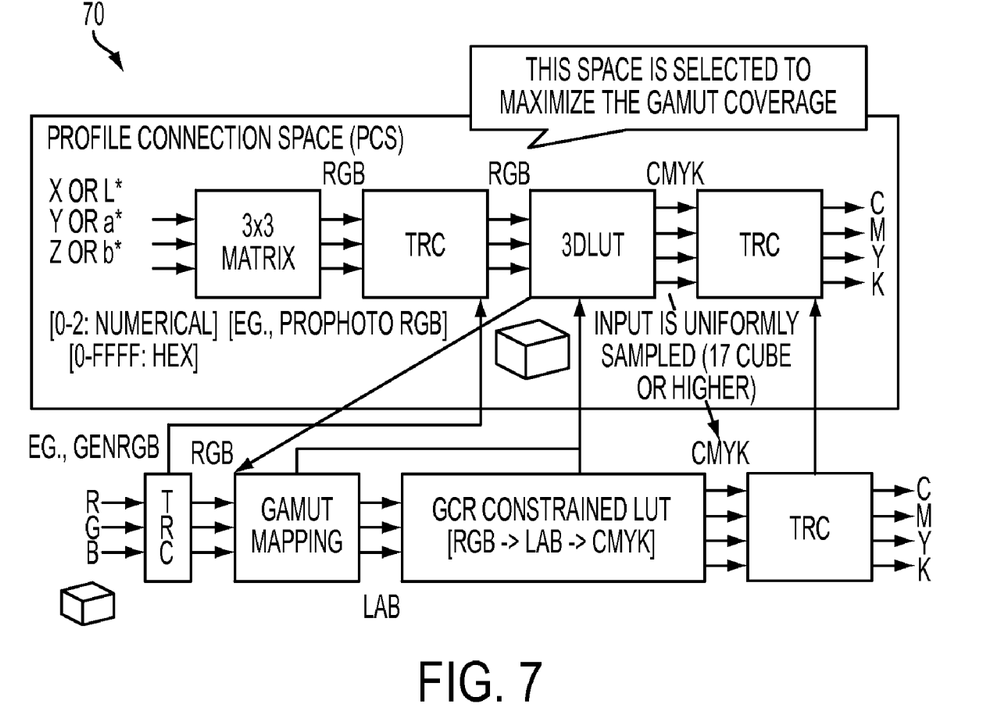
FIG. 7 is destination profile architecture in the ICC profile.

(2) A special destination profile is constructed as previously described by taking advantage of the ICC architecture. The ICC (International Color Consortium) was set up to provide a standard paradigm for managing color in image capture, display and rendering devices and is now, for example, being used in some Production Color and Entry Production Color RIPs. With reference to FIG. 7, a footprint 70 is shown of the destination ICC profile used with various components to translate color information between L*a*b*/XYZ (also called Profile Connection Space) to device specific CMYK space. CLUT (Color Lookup Table, shown in the middle of the diagram) is a component of the destination ICC profile which is a GCR constrained, gamut mapped lookup table from RGB triplets to device CMYK space. The final destination profile, however, is simply a L*a*b*/XYZ (input to FIG. 7) to CMYK transform (output of FIG. 7), in order to obtain the largest possible color gamut with minimum amount of toner and improved color rendition accuracy. The profile is divided into many components as shown in FIG. 7: the L*a*b* to RGB matrix; a pre-TRC; a LUT (RGB to CMYK); and a post-TRC. This type of division helps in the process of creating a final destination profile LUT. The presently disclosed techniques take advantage of this kind of architecture to develop a RGB-to-K LUT that can work at rated RIP speed like any other ICC profile and yet provide the gray scale to K only solution.

(3) The present disclosure describes an approach to how a LUT is constructed to provide the overall transformation to print gray scale images (in RGB space) to K only. This approach makes gray scale printing very efficient and can be applied to any RGB color space without detecting and building the transformation on the fly.

(4) Further, the disclosed methods allow for a tolerance zone near the neutral axis, which may be defined as monochrome, depending on overall color properties of the page. ICC architecture is well suited for high speed image processing and rendering applications. The RGB-to-K profile described in the present disclosure does not need to detect a neutral zone (or gray scale pixels) to render K-only images. Such detection algorithms cannot only slow down the RIP time, but can also lead to image quality defects such as non-smooth K only images.

Figure 8:
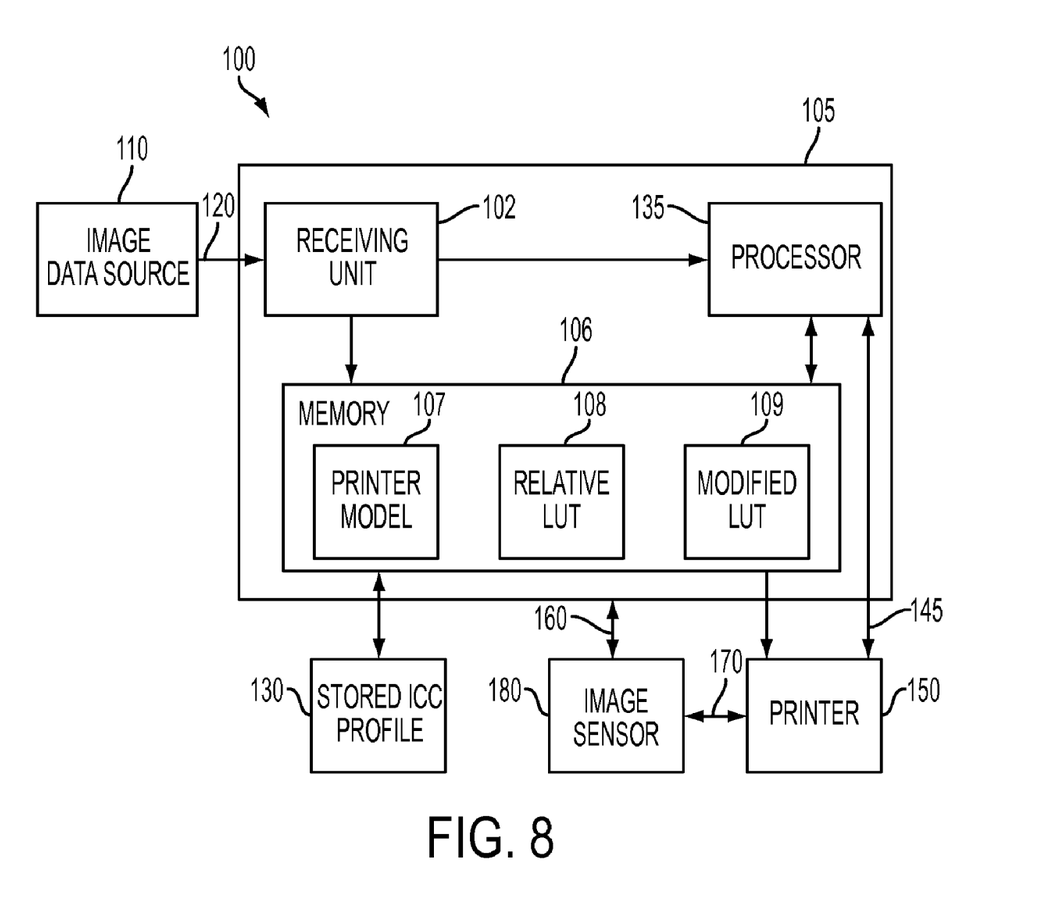
FIG. 8 is a system embodiment of the present application.

With reference now to FIG. 8, an exemplary system 100 embodying the RGB-to-K profile described in the present disclosure is shown. The system 100 is connected to an image data source 110, a system controller 105, a hard copy output device/printer 150, and an image sensor 180. A controller 105 includes a receiving unit 102 for receiving input color images. These devices are coupled together via data communication links 120, 145, 160, and 170. These links may be any type of link that permits the transmission of data, such as direct serial connections, a local area network (LAN), wide area network (WAN), an intranet, the Internet, circuit wirings, and the like.

The content for a printing job is initially provided by a customer through the image data source 110 in a form acceptable to the system. The image data source may be a personal computer, a microprocessor, a scanner, a disk drive, a tape drive, a hard disk, zip drive, CD-ROM drive, a DVD drive, a network server, a print server, a copying device, or any other known or later developed device or system that is able to provide the image data. Image data source 110 may include a plurality of components including displays, user interfaces, memory, disk drives, and the like. For simplicity of the following description, it will be assumed that the image data source is a personal computer, although, as indicated above, the image data source is not limited to a personal computer.

Hard copy output device 150 (for example one that represents an image of a physical object) may be any type of device that is capable of outputting a hard copy of an image and may take the form of a laser printer, a bubble jet printer, an ink jet printer, a copying machine, or any other known or later developed device or system that is able to generate an image on a recording medium using the image data or data generated from the image data. The hard copy output device 150 generates the hard copy of the image based on printable image data generated by the system.

Image sensor 180 can be any type of device that is capable of detecting image data from a hard copy image and supplying the image data as detected device-independent image data or device dependent image data or post-processed image data, which may be in device-independent or in device-dependent form to the system 105. For example, the image sensor may be an optical sensor, a spectrophotometer, a color sensor, an inline sensor, an off-line sensor, or any other known or later developed device or system that is able to measure the color values of the image data from the hard copy image output by the hard copy output device 150.

Although for the purposes of describing system 105 it is shown as a separate device from the image data source 110, the system 105 may be an integrated device, such as a digital copier, a computer with a built-in printer, or any other integrated device that is capable of producing a hard copy image output. With such a configuration, for example, the image data source 110, the system 105, the hard copy output device 150, and the sensor 180 may be contained within a single device.

Alternatively, the system 105 may be a separate device containing the system 105 and the sensor 180 attachable downstream of a stand-alone hard copy output device 150. For example, the system 105 and the sensor 180 may be a device which interfaces with both the image data source 110 and one or more hard copy output devices 150, as would be the case if the system 105 is incorporated into a network print server that manages printer data for a plurality of the same or different printing devices.

Furthermore, the system 105 may be implemented as software on the image data source 110 or the hard copy output device 150. The image sensor 180 may be incorporated into the hard copy output device 150 or may exist as a standalone device that communicates the detected data back to the image data source 110. Other configurations of the elements shown in FIG. 8 may be utilized without departing from the spirit and scope of the specification and claims herein.

The term "image", as used in this disclosure refers to a graphic or plurality of graphics, compilation of text, a contone or halftone pictorial image, or any combination or sub-combination thereof, that is capable of being output on a display device, a marker and the like, including a digital representation of such image. For example, an image may be a combination of graphics, text and pictures that is represented by a series of pixel values denoting the color, intensity, etc., of the particular pixels that make up the image (where the image is representative of a physical object). A special subclass of images is images associated with complete documents, which are hereinafter referred to as "document images". Thus an image may be a document image assembled by a customer at the image data source 110, one or more elements of a document image, a "test patch" generated by printing application software or another type of control system, or a member of a collection of images in a database. Image data source 110 provides image data that, when used to display the image or convert the image into a hard copy, provides an approximate representation of the image. The image data source 110 provides the image data to the system 105.

The image data input to the system 105 may be in either a device-dependent color space or a device-independent color space. For example, if the image data source 110 is a personal computer, the image data used for representing the image is typically in the RGB color space, since this is the color space used by a display of the image data source 110. These RGB values may be directly forwarded to the system 105 or may undergo conversion into a device-independent color space, such as $L*a*b*$, (the Commission Internationale de L'eclairage color standard) prior to being input to the system 105. $L*$ defines lightness, $a*$ corresponds to the red/green value, and $b*$ denotes the amount of yellow/blue, which corresponds to the way the human eye perceives color. A neutral color is a color for which $a*=b*=0$.

If the conversion of the device-dependent color space values into device-independent color space values is not performed by the image data source 110 when inputting the image data to system 105, then the system 105 may perform the conversion between the color spaces.

The system 105 transforms the device-independent image data into printable image data based on the color space used by the hard copy output device 150. For example, if the hard copy output device 150 is a printer, the color space used by the printer will often be the CMYK color space. In such a case, the system 105 converts the device-independent image data into CMYK-color space printable image data for the appropriate target value. Alternatively, the target values may be described in any of the color spaces, such as reflectance spectra, $L*a*b*$, CMYK, RGB, parameters describing color, sRGB, or even the color number, such as a Pantone® number.

Because of various factors, such as environmental conditions, use patterns, the type of media used, variations in media, variations from original models used in initializing the hard copy output device, general wear, and the like, the colors capable of being output by the hard copy output device 150 may not match the desired colors represented by the device-independent image data.

In the system, when a hard copy of the image is output by the hard copy output device 150, the hard copy is placed within the field of detection of the image sensor 180. Image sensor 180 generates image data from the hard copy image and transmits this image data in any of the device independent color coordinate spaces (reflectance spectra, $L*a*b*$, XYZ, LHC) or in device dependent spaces (CMY, CMYKL, RGB, sRGB) depending on the direct output or transformed output of the sensor image data to the system 105.

Within the system 105, a memory 106 controlled by the controller/processor 135 performs functions as previously described herein with reference to a printer model 107, a normal, relative LUT 108, to generate and utilize a modified LUT 109 and a stored ICC profile 130 based on the modified LUT.

The particular methods performed by the system 105 comprise steps which are described below with reference to a series of flow charts, i.e., FIGS. 9-11. The flow charts illustrate an embodiment in which the methods constitute computer programs made up of computer-executable instructions. Describing the methods by reference to a flowchart enables one skilled in the art to develop software programs including such instructions to carry out the methods on computing systems. The language used to write such programs can be procedural, such as Fortran, or object based, such as C++. One skilled in the art will realize that variations or combinations of these steps can be made without departing from the scope of the disclosure herein.

Figure 9:
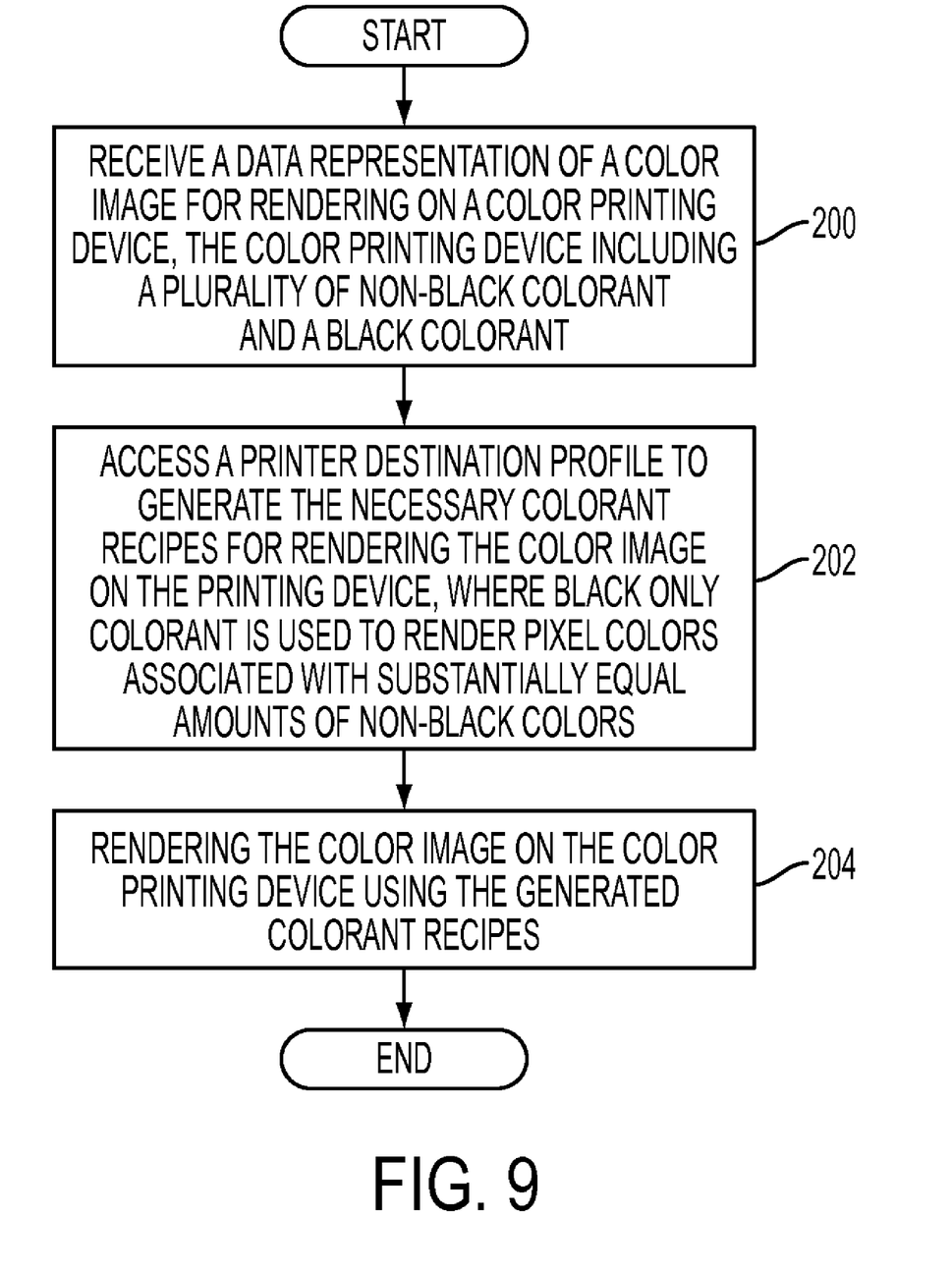
FIG. 9 is a flow chart illustrating a method of rendering a color image on a printing device according to an exemplary embodiment of this disclosure.

With reference to FIG. 9, illustrated is an exemplary method of rendering a color image on a color printing device, the color printing device including a plurality of non-back colorants and a black colorant.

Initially, the method begins execution and at step 200 receives a data representation of a color image for rendering on the color printing device.

Next, at step 202, a printing device destination profile is accessed to generate the necessary colorant recipes for rendering the color image on the printing device, where black only colorant is used to render pixel colors associated with substantially equal amounts of non-black colors.

Next, at step 204, the color image is rendered on the color printing device using the generated colorant recipes.

Figure 10:
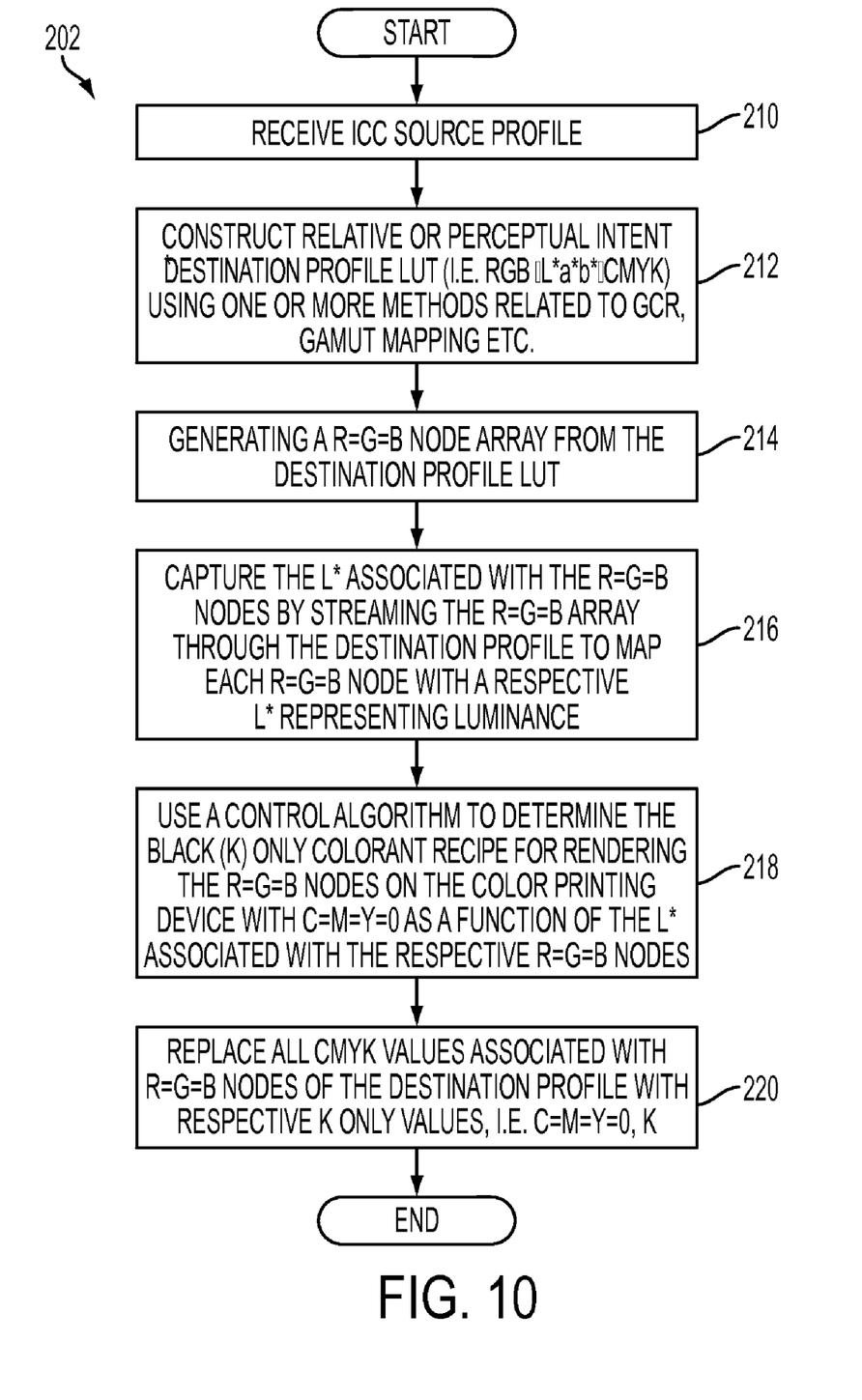
FIG. 10 is a flow chart illustrating an exemplary method of generating a destination profile for a color printing device including K-only colorant recipes for image colors associated with a neutral axis.

With reference to FIG. 10, illustrated is an exemplary algorithm 202 for generating a color printing device, the color printing device including a plurality of non-black colorants and a black colorant.

Initially, the algorithm receives an ICC source profile 210.

Next, at step 212, the algorithm constructs a relative or perceptual intent destination profile LUT (i.e., RGB→$L*a*b*$ CMYK) using one or more techniques related to GCR, Gamut mapping, etc.

Next, at step 214, a R=G=B node array is generated from the destination profile LUT.

Next, at step 216, the algorithm captures the $L*$ associated with the R=G=B nodes by streaming the R=G=B array through the destination profile to map each R=G=B node with a respective $L*$ representing luminance.

Next, at step 218, a control algorithm is used to determine the black (K) only colorant recipe for rendering the R=G=B nodes on the color printing device with C=M=Y=0 as a function of the $L*$ associated with the respective R=G=B nodes.

Finally, at step 220, the algorithm replaces all CMYK values associated with R=G=B nodes of the destination profile with respective K only values, i.e., C=M=Y=0, K.

Figure 11:
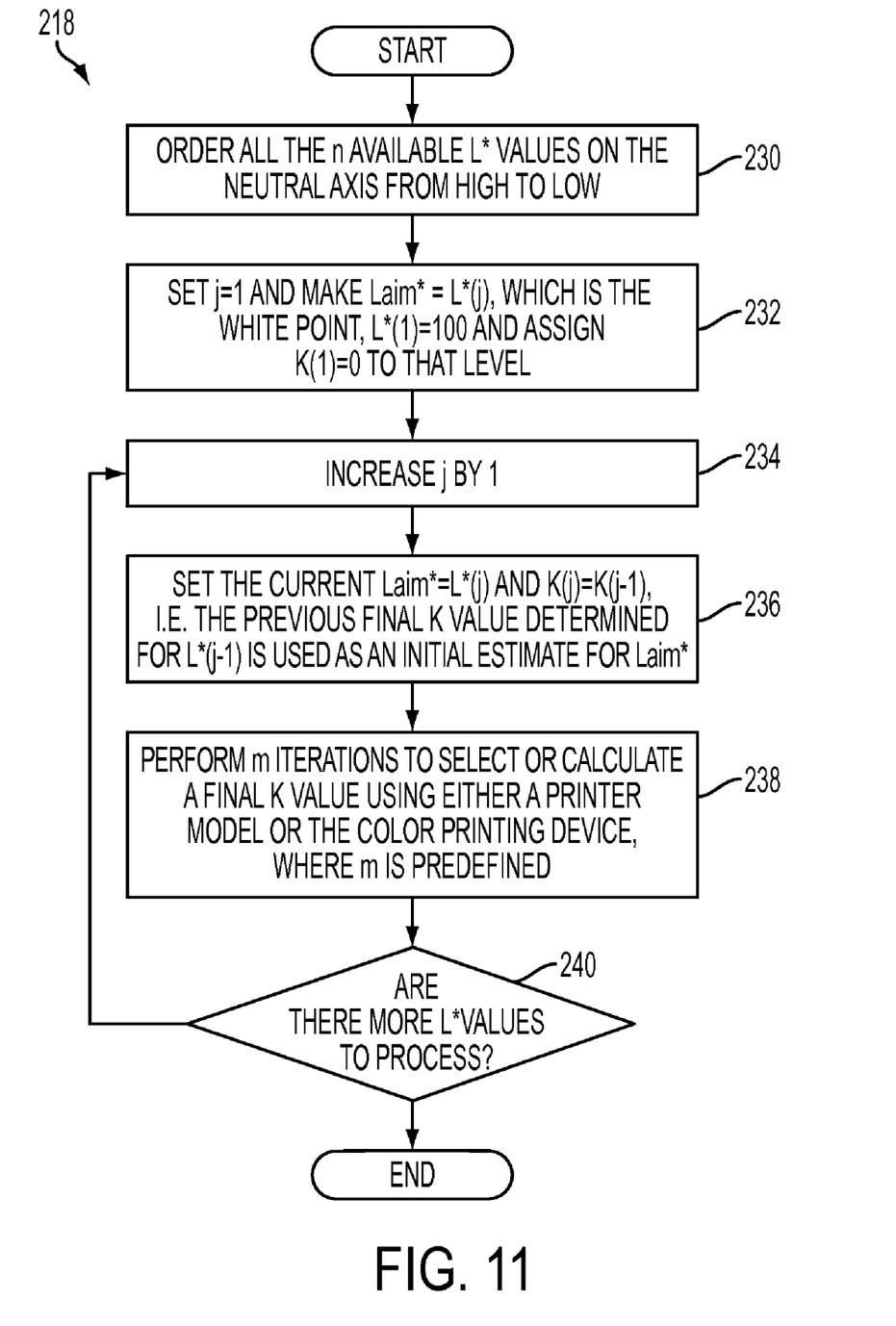
FIG. 11 is a flow chart illustrating an exemplary control algorithm to determine K-only colorant recipes for rendering R=G=B nodes as a function of the L* associated with the respective R=G=B nodes.

With reference to FIG. 11, illustrated is an exemplary control algorithm 218 to determine the Black (K) only colorant recipe for rendering the R=G=B nodes on the color printing device with C=M=Y=0 as a function of the $L*$ associated with the respective R=G=B nodes.

Initially, at step 230, the control algorithm orders all the n available $L*$ values on the neutral axis from high to low.

Next, at step 232, the control algorithm sets j=1 and makes $Laim*=L*(j)$, which is the white point, $L*(1)=100$ and assigns $K(1)=0$ to that level.

Next, at step 234, the control algorithm increases the value of j by 1.

Next, at step 236, the control algorithm sets the current Laim*=L*(j) and K(j)=K(j−1), i.e., the previous final K value determined for L*(j−1) is used as an initial estimate for Laim*.

Next, at step 238, the control algorithm performs m iterations to select or calculate a final K value using either a printer model or the color printing device, where m is predefined to be an integer, for example, 1, 2, 3, 4, 5, 6, 7, 8, 9, or 10.

Next, at step 240, the control algorithm determines if there are more L* values to process. If there are, the control algorithm returns to step 234 and increases j by 1. Otherwise, the control algorithm stops execution.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of generating a multidimensional destination profile for a color printing device, the color printing device including a plurality of non-black colorants and a black colorant, the method comprising:
   a) receiving a device independent multidimensional data representation of a plurality of target colors, the multidimensional data representations associated with a plurality of nodes in a device independent color space;
   b) running a process to generate a first destination profile for the color printing device, the first destination profile mapping the device independent multidimensional data representations associated with the plurality of target colors to device dependent multidimensional data representations associated with a device dependent color space, the device dependent multidimensional data representative of a plurality of colorant recipes for rendering the target colors using the color printing device;
   c) determining neutral axis target colors which are substantially representative of a neutral axis associated with the device independent color space; and
   d) modifying the first destination profile to generate a second destination profile by replacing the device dependent multidimensional data representations mapped to the neutral axis target colors with black only device dependent data representations, the black only device dependent data representative of the black colorant amount for rendering the neutral axis target colors using the color printing device, wherein the first destination profile is modified by iteratively calculating the black only device dependent data representations using a color printing device model or the color printing device, where the initial estimate of a black only device dependent data representation associated with a respective neutral axis target color is a black only device dependent data representation associated with a neighboring neutral axis target color.

2. The method of generating a multidimensional destination profile according to claim 1, step d) further comprising:
   capturing the luminance associated with the neutral axis target colors and modifying the first destination profile to generate the second destination profile by replacing the device dependent multidimensional data representation mapped to the neutral axis target colors with black-only device dependent data representations as a function of the luminance associated with the respective neutral axis target colors.

3. The method of generating a multidimensional destination profile according to claim 1, wherein the first destination profile generated for the color printing device in step b) is associated with one of colorimetric rendering and perceptual rendering.

4. The method of generating a multidimensional destination profile according to claim 1, wherein the device independent multidimensional data representation of a plurality of target colors is a first multidimensional LUT mapping target colors represented in RGB color space to device independent L*a*b* color space, the first destination profile for the color printing device is a second multidimensional LUT mapping the target colors represented in RGB color space to the device independent L*a*b* color space which are mapped to device dependent CMYK color space.

5. The method of generating a multidimensional destination profile according to claim 4, step d) further comprising:
   capturing the luminance associated with the neutral axis target colors by capturing the L* values associated with the neutral axis target colors and modifying the first destination profile to generate the second destination profile by replacing the CMYK device dependent multidimensional data representation mapped to the neutral axis target colors with C=0, M=0, Y=0 and K equal to a value calculated as a function of the captured L* associated with the respective neutral axis target color.

6. The method of generating a multidimensional destination profile according to claim 5, step d) further comprising:
   iteratively calculating the K value associated with each neutral target color using the captured L* values as Laim* values, calculating an initial K value associated with the Laim* value, determining the output L* associated with the initial K value using the color printing device model or the color printing device, measuring the difference between the output L* and Laim*, and calculating a new K value as a function of the difference between the output L* and Laim*.

7. The method of generating a multidimensional destination profile according to claim 6, step d) further comprising:
   using a final K value calculated for a first neutral axis target color as the initial K value for iteratively calculating the K value associated with a second neutral axis target color, the first and second neutral axis target colors related as neighboring nodes on the neutral axis associated with the device independent color space.

8. The method of generating a multidimensional destination profile according to claim 1,
   step b) further comprising:
      generating a RGB→L*a*b*→CMYK LUT;
   step c) further comprising:
      capturing from the RGB→L*a*b*→CMYK LUT a plurality of L*s associated with a plurality of respective R=G=B levels;
   step d) further comprising:
      executing a control algorithm to determine the K values corresponding to the plurality of L*s, the control algorithm
      d1) ordering all the n L* values on the neutral axis from high to low values;
      d2) setting j=1, where Laim*=L*(j) and L*(1) is associated with a white point and assign K(1)=0 to that Level;
      d3) increasing j by 1;
      d4) setting the current Laim*=L*(j) and K(j)=K(j−1), whereby the previous final K value determined for L*(j−1) is used as an initial K value for Laim*;

d5) performing a predefined number of iterations on the color printing device model or the color printing device to determine a final K value for K(j); and d6) if there are more L* values to process, go to step d3), otherwise stop execution of the control algorithm.

9. A printing apparatus controller comprising:
a computer-usable data carrier storing instructions that, when executed by the controller cause the controller to perform a method of generating a multidimensional destination profile for a color printing device, the color printing device including a plurality of non-black colorants and a black colorant, the method comprising:

a) receiving a device independent multidimensional data representation of a plurality of target colors, the multidimensional data representations associated with a plurality of nodes in a device independent color space;

b) running a process to generate a first destination profile for the color printing device, the first destination profile mapping the device independent multidimensional data representations associated with the plurality of target colors to device dependent multidimensional data representations associated with a device dependent color space, the device dependent multidimensional data representative of a plurality of colorant recipes for rendering the target colors using the color printing device;

c) determining neutral axis target colors which are substantially representative of a neutral axis associated with the device independent color space; and d) modifying the first destination profile to generate a second destination profile by replacing the device dependent multidimensional data representations mapped to the neutral axis target colors with black only device dependent data representations, the black only device dependent data representative of the black colorant amount for rendering the neutral axis target colors using the color printing device, wherein the first destination profile is modified by iteratively calculating the black only device dependent data representations using a color printing device model or the color printing device, where the initial estimate of a black only device dependent data representation associated with a respective neutral axis target color is a black only device dependent data representation associated with a neighboring neutral axis target color.

10. The printing apparatus controller according to claim 9, step d) further comprising:
capturing the luminance associated with the neutral axis target colors and modifying the first destination profile to generate the second destination profile by replacing the device dependent multidimensional data representation mapped to the neutral axis target colors with black-only device dependent data representations as a function of the luminance associated with the respective neutral axis target colors.

11. The printing apparatus controller according to claim 9, wherein the first destination profile generated for the color printing device in step b) is associated with one of colorimetric rendering and perceptual rendering.

12. The printing apparatus controller according to claim 9, wherein the device independent multidimensional data representation of a plurality of target colors is a first multidimensional LUT mapping target colors represented in RGB color space to device independent L*a*b* color space, the first destination profile for the color printing device is a second multidimensional LUT mapping the target colors represented in RGB color space to the device independent L*a*b* color space which are mapped to device dependent CMYK color space.

13. The printing apparatus controller according to claim 12, step d) further comprising:
capturing the luminance associated with the neutral axis target colors by capturing the L* values associated with the neutral axis target colors and modifying the first destination profile to generate the second destination profile by replacing the CMYK device dependent multidimensional data representation mapped to the neutral axis target colors with C=0, M=0, Y=0 and K equal to a value calculated as a function of the captured L* associated with the respective neutral axis target color.

14. The printing apparatus controller according to claim 13, step d) further comprising:
iteratively calculating the K value associated with each neutral target color using the captured L* values as Laim* values, calculating an initial K value associated with the Laim* value, determining the output L* associated with the initial K value using the color printing device model or the color printing device, measuring the difference between the output L* and Laim*, and calculating a new K value as a function of the difference between the output L* and Laim*.

15. The printing apparatus controller according to claim 14, step d) further comprising:
using a final K value calculated for a first neutral axis target color as the initial K value for iteratively calculating the K value associated with a second neutral axis target color, the first and second neutral axis target colors related as neighboring nodes on the neutral axis associated with the device independent color space.

16. The printing apparatus controller according to claim 9, step b) further comprising:
generating a RGB→L*a*b*→CMYK LUT;
step c) further comprising:
capturing from the RGB→L*a*b*→CMYK LUT a plurality of L*s associated with a plurality of respective R=G=B levels;
step d) further comprising:
executing a control algorithm to determine the K values corresponding to the plurality of L*s, the control algorithm
d1) ordering all the n L* values on the neutral axis from high to low values;
d2) setting j=1, where Laim*=L*(j) and L*(1) is associated with a white point and assign K(1)=0 to that Level;
d3) increasing j by 1;
d4) setting the current Laim*=L*(j) and K(j)=K(j−1), whereby the previous final K value determined for L*(j−1) is used as an initial K value for Laim*;
d5) performing a predefined number of iterations on the color printing device model or the color printing device to determine a final K value for K(j); and
d6) if there are more L* values to process, go to step d3), otherwise stop execution of the control algorithm.

17. A printing system comprising:
a color printing device including a plurality of non-black colorants and a black colorant, the color printing device configured to receive a data representation of a color image to be marked on a media substrate; and
a controller operatively connected to the color printing device, the controller configured to access a multidimensional destination profile, the multidimensional destination profile generated by the method comprising:

a) receiving a device independent multidimensional data representation of a plurality of target colors, the multidimensional data representations associated with a plurality of nodes in a device independent color space;
b) running a process to generate a first destination profile for the color printing device, the first destination profile mapping the device independent multidimensional data representations associated with the plurality of target colors to device dependent multidimensional data representations associated with a device dependent color space, the device dependent multidimensional data representative of a plurality of colorant recipes for rendering the target colors using the color printing device;
c) determining neutral axis target colors which are substantially representative of a neutral axis associated with the device independent color space; and
d) modifying the first destination profile to generate a second destination profile by replacing the device dependent multidimensional data representations mapped to the neutral axis target colors with black only device dependent data representations, the black only device dependent data representative of the black colorant amount for rendering the neutral axis target colors using the color printing device, wherein the first destination profile is modified by iteratively calculating the black only device dependent data representations using a color printing device model or the color printing device, where the initial estimate of a black only device dependent data representation associated with a respective neutral axis target color is a black only device dependent data representation associated with a neighboring neutral axis target color.

18. The printing system according to claim 17, step d) further comprising:
capturing the luminance associated with the neutral axis target colors and modifying the first destination profile to generate the second destination profile by replacing the device dependent multidimensional data representation mapped to the neutral axis target colors with black-only device dependent data representations as a function of the luminance associated with the respective neutral axis target colors.

19. The printing system according to claim 17, wherein the first destination profile generated for the color printing device in step b) is associated with one of colorimetric rendering and perceptual rendering.

20. The printing system according to claim 17, wherein the device independent multidimensional data representation of a plurality of target colors is a first multidimensional LUT mapping target colors represented in RGB color space to device independent L*a*b* color space, the first destination profile for the color printing device is a second multidimensional LUT mapping the target colors represented in RGB color space to the device independent L*a*b* color space which are mapped to device dependent CMYK color space.

21. The printing system according to claim 20, step d) further comprising:
capturing the luminance associated with the neutral axis target colors by capturing the L* values associated with the neutral axis target colors and modifying the first destination profile to generate the second destination profile by replacing the CMYK device dependent multidimensional data representation mapped to the neutral axis target colors with C=0, M=0, Y=0 and K equal to a value calculated as a function of the captured L* associated with the respective neutral axis target color.

22. The printing system according to claim 21, step d) further comprising:
iteratively calculating the K value associated with each neutral target color using the captured L* values as Laim* values, calculating an initial K value associated with the Laim* value, determining the output L* associated with the initial K value using the color printing device model or the color printing device, measuring the difference between the output L* and Laim*, and calculating a new K value as a function of the difference between the output L* and Laim*.

23. The printing system according to claim 22, step d) further comprising:
using a final K value calculated for a first neutral axis target color as the initial K value for iteratively calculating the K value associated with a second neutral axis target color, the first and second neutral axis target colors related as neighboring nodes on the neutral axis associated with the device independent color space.

24. The printing system according to claim 17,
step b) further comprising:
generating a RGB→L**a*b*→CMYK LUT;
step c) further comprising:
capturing from the RGB→L*a*b*→CMYK LUT a plurality of L*s associated with a plurality of respective R=G=B levels;
step d) further comprising:
executing a control algorithm to determine the K values corresponding to the plurality of L*s, the control algorithm
d1) ordering all the n L* values on the neutral axis from high to low values;
d2) setting j=1, where Laim*=L*(j) and L*(1) is associated with a white point and assign K(1)=0 to that Level;
d3) increasing j by 1;
d4) setting the current Laim*=L*(j) and K(j)=K(j−1), whereby the previous final K value determined for L*(j−1) is used as an initial K value for Laim*;
d5) performing a predefined number of iterations on the color printing device model or the color printing device to determine a final K value for K(j); and
d6) if there are more L* values to process, go to step d3), otherwise stop execution of the control algorithm.

* * * * *